United States Patent
Raffa et al.

(10) Patent No.: US 10,534,439 B2
(45) Date of Patent: Jan. 14, 2020

(54) TECHNIQUES FOR GESTURE-BASED INITIATION OF INTER-DEVICE WIRELESS CONNECTIONS

(71) Applicant: INTEL CORPORATION, Santa Clara, CA (US)

(72) Inventors: Giuseppe Raffa, Portland, OR (US); Sangita Sharma, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/651,546

(22) Filed: Jul. 17, 2017

(65) Prior Publication Data

US 2018/0157331 A1    Jun. 7, 2018

Related U.S. Application Data

(63) Continuation of application No. 13/727,105, filed on Dec. 26, 2012, now Pat. No. 9,746,926.

(51) Int. Cl.
*G06F 3/01* (2006.01)
*G06F 3/03* (2006.01)
*G06F 3/0346* (2013.01)

(52) U.S. Cl.
CPC ............ *G06F 3/017* (2013.01); *G06F 3/0304* (2013.01); *G06F 3/0346* (2013.01)

(58) Field of Classification Search
CPC ...... G06F 3/017; G06F 3/0304; G06F 3/0346; G06F 3/0488; G06F 3/04883; G06F 1/1694
See application file for complete search history.

(56) References Cited

U.S. PATENT DOCUMENTS

| | | | |
|---|---|---|---|
| 8,224,351 B1 | 7/2012 | Sushkov et al. | |
| 8,539,550 B1 | 9/2013 | Terres et al. | |
| 8,782,136 B1 | 7/2014 | Ho et al. | |
| 2002/0085097 A1* | 7/2002 | Colmenarez | G06F 3/0304 348/211.4 |
| 2007/0268911 A1 | 11/2007 | Alve | |
| 2008/0016018 A1 | 1/2008 | Malik | |
| 2008/0059578 A1* | 3/2008 | Albertson | G06F 3/016 709/204 |
| 2009/0150762 A1 | 6/2009 | Febonio et al. | |
| 2010/0082990 A1 | 4/2010 | Grigorovitch | |
| 2011/0106954 A1 | 5/2011 | Chatterjee et al. | |
| 2011/0175822 A1 | 7/2011 | Poon et al. | |
| 2012/0023573 A1 | 1/2012 | Shi | |
| 2012/0042087 A1 | 2/2012 | Berg et al. | |

(Continued)

OTHER PUBLICATIONS

Office Action received for U.S. Appl. No. 14/868,229, dated Jan. 25, 2018, 77 pages.

*Primary Examiner* — Lisa S Landis

(57) ABSTRACT

Techniques for gesture-based device connections are described. For example, a method may comprise receiving video data corresponding to motion of a first computing device, receiving sensor data corresponding to motion of the first computing device, comparing, by a processor, the video data and the sensor data to one or more gesture models, and initiating establishment of a wireless connection between the first computing device and a second computing device if the video data and sensor data correspond to gesture models for the same gesture. Other embodiments are described and claimed.

27 Claims, 7 Drawing Sheets

(56) References Cited

U.S. PATENT DOCUMENTS

| | | |
|---|---|---|
| 2012/0274550 A1 | 11/2012 | Campbell et al. |
| 2012/0322480 A1 | 12/2012 | Hoover et al. |
| 2013/0165098 A1* | 6/2013 | Nakazawa ............ H04W 4/026 455/418 |
| 2013/0169546 A1 | 7/2013 | Thomas et al. |
| 2013/0169550 A1 | 7/2013 | Gai et al. |

* cited by examiner

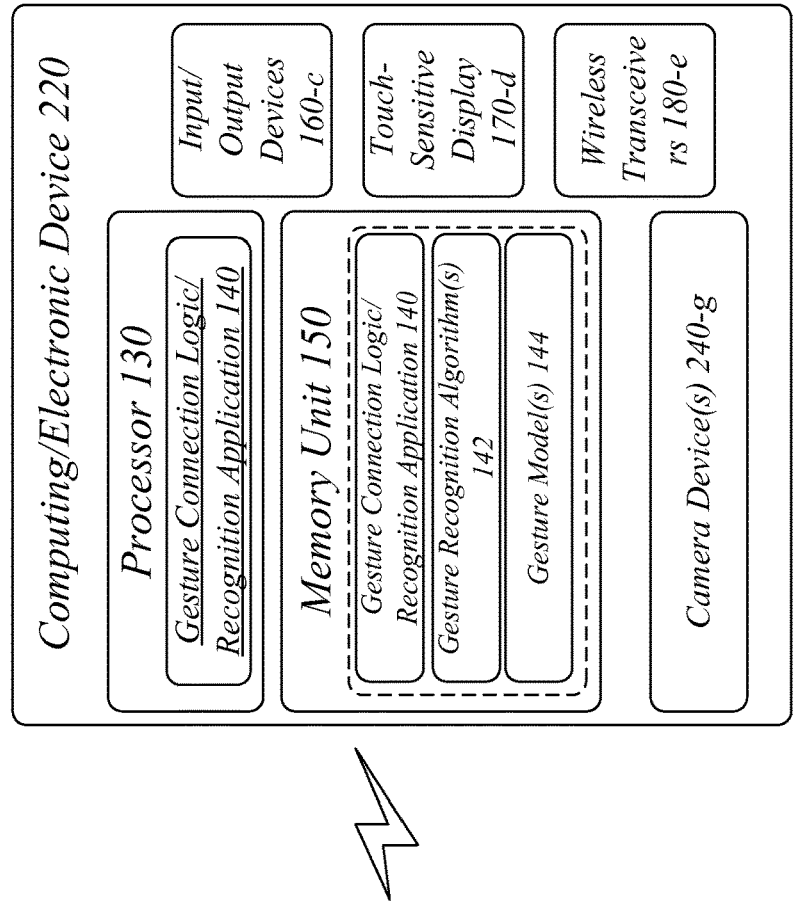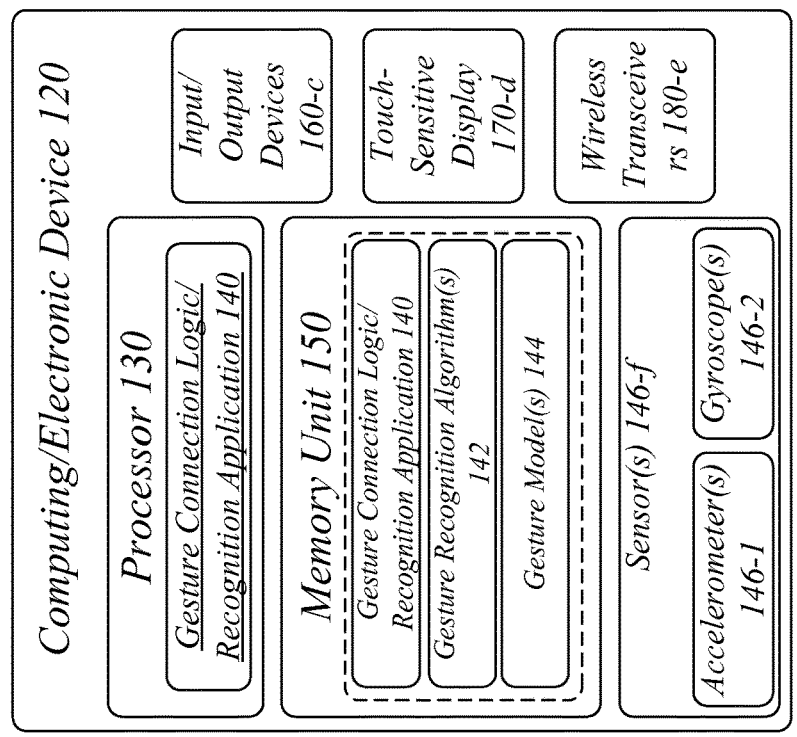
FIG. 1

600

```
RECEIVE VIDEO DATA CORRESPONDING TO MOTION OF A
FIRST COMPUTING DEVICE
602
```

```
RECEIVE SENSOR DATA CORRESPONDING TO MOTION OF
THE FIRST COMPUTING DEVICE
604
```

```
COMPARE THE VIDEO DATA AND THE SENSOR DATA TO ONE
OR MORE GESTURE MODELS
606
```

```
ESTABLISH A WIRELESS CONNECTION BETWEEN THE FIRST
COMPUTING DEVICE AND A SECOND COMPUTING DEVICE
IF THE VIDEO DATA AND THE SENSOR DATA CORRESPOND
TO A GESTURE MODEL
608
```

*FIG. 6*

TECHNIQUES FOR GESTURE-BASED INITIATION OF INTER-DEVICE WIRELESS CONNECTIONS

CROSS-REFERENCE TO RELATED APPLICATIONS

This application is a continuation of, claims the benefit of and priority to previously filed U.S. patent application Ser. No. 13/727,105 filed Dec. 26, 2012, entitled "Techniques for Gesture-Based Initiation of Inter-Device Wireless Connections," the subject matter of which are incorporated herein by reference in their entireties.

BACKGROUND

Establishing wireless connections between two or more computing devices is becoming increasingly common as the mobility and functionality of computing devices continues to evolve. Establishing these connections using currently available techniques, however, can be cumbersome and may require manipulation of each device, manipulation of different interfaces, and other interactions that may become increasingly difficult as computing devices continue to decrease in size which may result in less space to display authentication and other information. For example, current solutions may involve manually entering access or identification codes on each device that may difficult on smaller devices such as smart phones.

In the mobile space, gesture interaction and gesture inputs are an attractive alternative to traditional interfaces because they do not involve the shrinking of the form factor of traditional input devices such as a keyboard, mouse or screen. While suitable for input to or control of a single computing device, current implementations of gesture interaction and gesture input fail to provide a simple and secure solution for establishing connections with other computing devices. Additionally, gesture interaction and gesture inputs alone may not provide adequate options for security and/or customization of a connection between two or more devices because control, input or other information from only a single device may be required.

Video and other image capture devices are also becoming common in computing devices. As these technologies continue to evolve, they have become increasing adept at recognizing and identifying objects, users, motion, etc. Their use in establishing connections with other devices may be limited using current solutions however because current system may be easily fooled by unauthorized users and, as with gesture input, information from only one device (e.g. the video or other image capture device) may be used. Therefore, techniques for establishing a connection between two or more devices using different forms of input may be desirable. For example, it may be desirable to combine the video and/or image capture capabilities of one computing device with the gesture recognition capabilities of another computing device leveraging sensors such as accelerometers and gyroscopes to enable a seamless, secure and simple connection between the devices. It is with respect to these and other considerations that the embodiments described herein are needed.

BRIEF DESCRIPTION OF THE DRAWINGS

FIG. 1 illustrates an embodiment of a first system.
FIG. 6 illustrates an embodiment of a logic flow.

DETAILED DESCRIPTION

Figure 2:
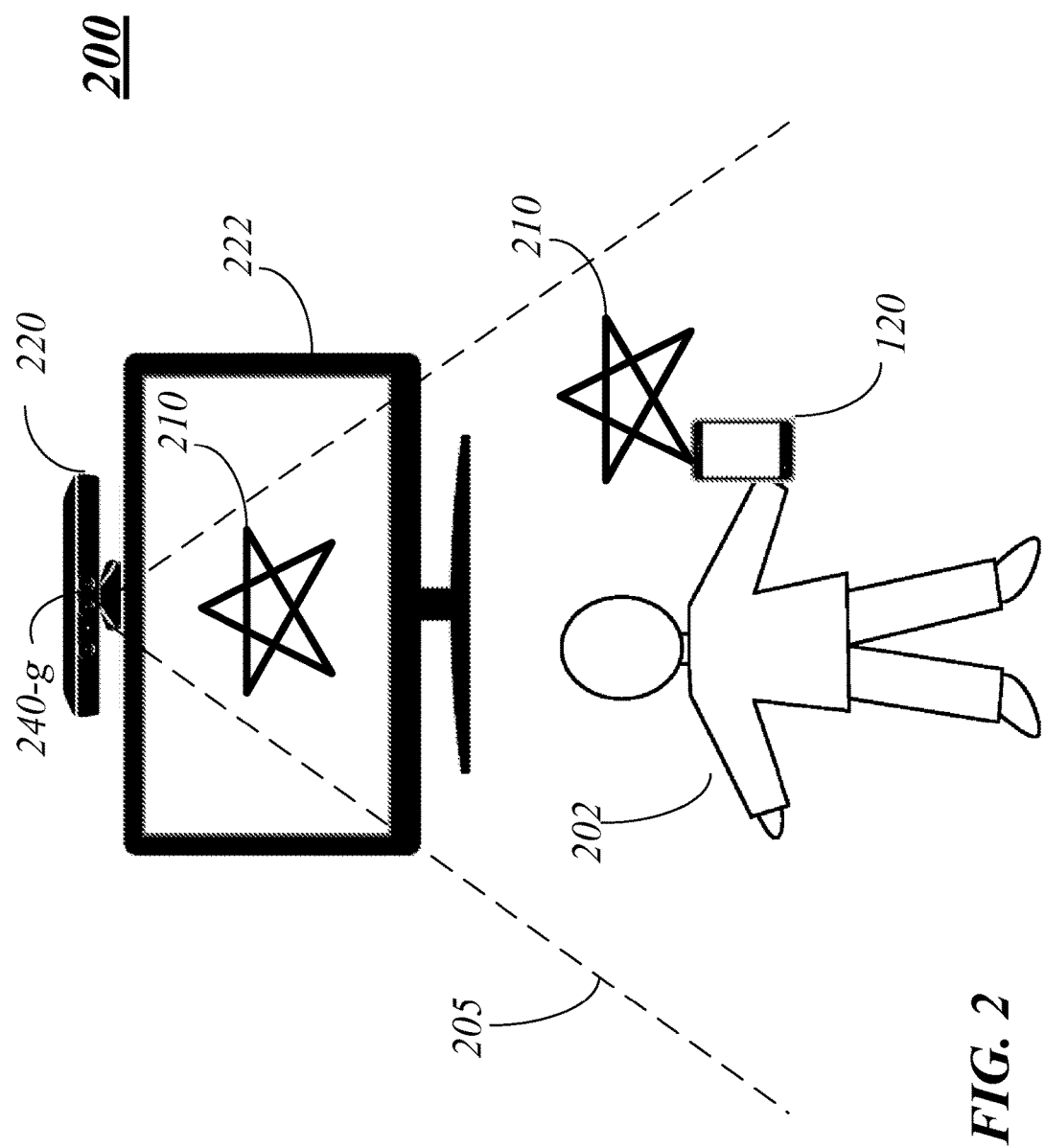
FIG. 2 illustrates an embodiment of a first operating environment

Various embodiments are generally directed to techniques for gesture based device connections. Some embodiments are particularly directed to detecting a gesture using two or more different detection methods or technologies to enable a simple, seamless and secure connection between two or more devices. The embodiments described herein combine the use of physical sensors (e.g. gyroscope, accelerometer, etc.) in one device with a video or other image capture device (e.g. video camera, etc.) in another device to verify a gesture authentication attempt and to enable a connection between the devices. The gesture authentication techniques described herein operate to significantly increase the reliability and simplicity of establishing secure wireless connections between devices, thereby enhancing device performance, user productivity, convenience, and experience.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-based system comprising one or more electronic devices or, as referred to hereinafter, computing devices such as computing device 120 and computing device 220. Each computing device 120, 220 may comprise, for example, a processor 130, a memory unit 150, input/output devices 160-c, displays 170-d, and one or more transceivers 180-e. In some embodiments, the computing device 120 may include one or more sensors 146-f. In some embodiments, the sensors 146-f may include one or more accelerometers 146-1 and/or gyroscopes 146-2. The computing device 220 may include one or more camera devices 240-g in various embodiments. The one or more camera devices 240-g may comprise any suitable image capture device including but not limited to a video camera, still camera or an infrared camera. The embodiments are not limited in this respect.

Each computing device 120, 220 may further have installed or comprise a gesture recognition application 140. The memory unit 150 may store an unexecuted version of the gesture recognition application 140 and one or more gesture recognition algorithms 142 and gesture models 144. While the gesture recognition algorithms 142 and gesture models 144 are shown as separate components or modules in FIG. 1, it should be understood that one or more of gesture recognition algorithms 142 and gesture models 144 could be part of gesture recognition algorithm 140 and still fall within the described embodiments. Also, although the system 100 shown in FIG. 1 has a limited number of elements in a certain topology, it may be appreciated that the system 100 may include more or less elements in alternate topologies as desired for a given implementation.

It is worthy to note that "a" and "b" and "c" and similar designators as used herein are intended to be variables representing any positive integer. Thus, for example, if an implementation sets a value for e=5, then a complete set of wireless transceivers 180 may include wireless transceivers 180-1, 180-2, 180-3, 180-4 and 180-5. The embodiments are not limited in this context.

In various embodiments, the system 100 may comprise computing devices 120 and 220. Some examples of an computing devices may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, machine, or combination thereof. The embodiments are not limited in this context.

In various embodiments, computing devices 120, 220 of the system 100 may comprise a processor 130. The processor 130 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core (2) Quad®, Core i3®, Core i5®, Core i7®, Atom®, Itanium®, Pentium®, Xeon®, and XScale® processors; and similar processors. Dual microprocessors, multi-core processors, and other multi-processor architectures may also be employed as the processing 130.

In various embodiments, computing devices 120, 220 of the system 100 may comprise a memory unit 150. The memory unit 150 may store, among other types of information, the gesture recognition application 140, gesture recognition algorithms 142 and gesture models 144. The memory unit 150 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

In various embodiments, the computing devices 120, 220 may comprise one or more input/output devices 160-c. The one or more input/output devices 160-c may be arranged to provide functionality to the computing devices 120, 220 including but not limited to capturing images, exchanging information, capturing or reproducing multimedia information, determining a location of the computing devices 120, 220 or any other suitable functionality. Non-limiting examples of input/output devices 160-c include a QR reader/writer, bar code reader, a global positioning system (GPS) module, and a display 170-d coupled with an electronic device 120. The embodiments are not limited in this respect.

The computing devices 120, 220 may comprise one or more displays 170-d in some embodiments. The displays 170-d may comprise any digital display device suitable for the electronic devices 120. For instance, the displays 170-d may be implemented by a liquid crystal display (LCD) such as a touch-sensitive, color, thin-film transistor (TFT) LCD, a plasma display, a light emitting diode (LED) display, an organic light emitting diode (OLED) display, a cathode ray tube (CRT) display, or other type of suitable visual interface for displaying content to a user of computing devices 120, 220. The displays 170-d may further include some form of a backlight or brightness emitter as desired for a given implementation.

In various embodiments, the displays 170-d may comprise touch-sensitive or touchscreen displays. A touchscreen may comprise an electronic visual display that is operative to detect the presence and location of a touch within the display area or touch interface. In some embodiments, the display may be sensitive or responsive to touching of the display of the device with a finger or hand. In other embodiments, the display may be operative to sense other passive objects, such as a stylus or electronic pen. In various embodiments, displays 170-d may enable a user to interact directly with what is displayed, rather than indirectly with a pointer controlled by a mouse or touchpad. Other embodiments are described and claimed.

The computing devices 120, 220 may comprise one or more wireless transceivers 180-e. Each of the wireless transceivers 180-e may be implemented as physical wireless adapters or virtual wireless adapters sometimes referred to as "hardware radios" and "software radios." In the latter case, a single physical wireless adapter may be virtualized using software into multiple virtual wireless adapters. A physical wireless adapter typically connects to a hardware-based wireless access point. A virtual wireless adapter typically connects to a software-based wireless access point, sometimes referred to as a "SoftAP." For instance, a virtual wireless adapter may allow ad hoc communications between peer devices, such as a smart phone and a desktop computer or notebook computer. Various embodiments may use a single physical wireless adapter implemented as multiple virtual wireless adapters, multiple physical wireless adapters, multiple physical wireless adapters each implemented as multiple virtual wireless adapters, or some combination thereof. The embodiments are not limited in this case.

The wireless transceivers 180-e may comprise or implement various communication techniques to allow the computing devices 120, 220 to communicate with other electronic or computing devices. For instance, the wireless transceivers 180-e may implement various types of standard communication elements designed to be interoperable with a network, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

In various embodiments, the computing devices 120, 220 may implement different types of wireless transceivers 180-e. Each of the wireless transceivers 180-e may implement or utilize a same or different set of communication parameters to communicate information between various electronic devices. In one embodiment, for example, each of the wireless transceivers 180-e may implement or utilize a different set of communication parameters to communicate information between computing devices 120 and 220 or between computing devices 120, 220 and a remote device. Some examples of communication parameters may include without limitation a communication protocol, a communication standard, a radio-frequency (RF) band, a radio, a transmitter/receiver (transceiver), a radio processor, a baseband processor, a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for the wireless transceivers 180-e. The embodiments are not limited in this context.

In various embodiments, the wireless transceivers 180-e may implement different communication parameters offering varying bandwidths, communications speeds, or transmission range. For instance, a first wireless transceiver 180-1 may comprise a short-range interface implementing suitable communication parameters for shorter range communications of information, while a second wireless transceiver 180-2 may comprise a long-range interface implementing suitable communication parameters for longer range communications of information.

In various embodiments, the terms "short-range" and "long-range" may be relative terms referring to associated communications ranges (or distances) for associated wireless transceivers 180-e as compared to each other rather than an objective standard. In one embodiment, for example, the term "short-range" may refer to a communications range or distance for the first wireless transceiver 180-1 that is shorter than a communications range or distance for another wireless transceiver 180-e implemented for the electronic device 120, such as a second wireless transceiver 180-2. Similarly, the term "long-range" may refer to a communications range or distance for the second wireless transceiver 180-2 that is longer than a communications range or distance for another wireless transceiver 180-e implemented for the electronic device 120, such as the first wireless transceiver 180-1. The embodiments are not limited in this context.

In various embodiments, the terms "short-range" and "long-range" may be relative terms referring to associated communications ranges (or distances) for associated wireless transceivers 180-e as compared to an objective measure, such as provided by a communications standard, protocol or interface. In one embodiment, for example, the term "short-range" may refer to a communications range or distance for the first wireless transceiver 180-1 that is shorter than 300 meters or some other defined distance. Similarly, the term "long-range" may refer to a communications range or distance for the second wireless transceiver 180-2 that is longer than 300 meters or some other defined distance. The embodiments are not limited in this context.

In one embodiment, for example, the wireless transceiver 180-1 may comprise a radio designed to communicate information over a wireless personal area network (WPAN) or a wireless local area network (WLAN). The wireless transceiver 180-1 may be arranged to provide data communications functionality in accordance with different types of lower range wireless network systems or protocols. Examples of suitable WPAN systems offering lower range data communication services may include a Bluetooth system as defined by the Bluetooth Special Interest Group, an infra-red (IR) system, an Institute of Electrical and Electronics Engineers (IEEE) 802.15 system, a DASH7 system, wireless universal serial bus (USB), wireless high-definition (HD), an ultra-side band (UWB) system, and similar systems. Examples of suitable WLAN systems offering lower range data communications services may include the IEEE 802.xx series of protocols, such as the IEEE 802.11a/b/g/n series of standard protocols and variants (also referred to as "WiFi"). It may be appreciated that other wireless techniques may be implemented, and the embodiments are not limited in this context.

In one embodiment, for example, the wireless transceiver 180-2 may comprise a radio designed to communicate information over a wireless local area network (WLAN), a wireless metropolitan area network (WMAN), a wireless wide area network (WWAN), or a cellular radiotelephone system. The wireless transceiver 180-2 may be arranged to provide data communications functionality in accordance with different types of longer range wireless network systems or protocols. Examples of suitable wireless network systems offering longer range data communication services may include the IEEE 802.xx series of protocols, such as the IEEE 802.11a/b/g/n series of standard protocols and variants, the IEEE 802.16 series of standard protocols and variants, the IEEE 802.20 series of standard protocols and variants (also referred to as "Mobile Broadband Wireless Access"), and so forth. Alternatively, the wireless transceiver 180-2 may comprise a radio designed to communication information across data networking links provided by one or more cellular radiotelephone systems. Examples of cellular radiotelephone systems offering data communications services may include GSM with General Packet Radio Service (GPRS) systems (GSM/GPRS), CDMA/1×RTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and similar systems. It may be appreciated that other wireless techniques may be implemented, and the embodiments are not limited in this context.

In various embodiments, computing devices 120 may include one more sensors 146-f. Sensors 146-f may comprise any combination of inertial sensors capable of determining or detecting an orientation and/or movement of computing device 120. For example, in some embodiments the sensors 146-f may comprise one or more accelerometers 146-1 and/or one or more gyroscopes 146-2. Any suitable type of accelerometer 146-1 and/or gyroscope 146-2 could be used and still fall within the described embodiments as one skilled in the art would readily understand. In some embodiments, the accelerometer 146-1 and/or gyroscope 146-2 may comprise or be implemented using microelectromechanical systems (MEMS) technology. The embodiments are not limited in this respect.

Computing device 220 may include one or more camera devices 240-g in some embodiments. The camera devices 240-g may comprise any suitable image capture device including but not limited to a video camera, still camera, infrared camera or any combination thereof. In various embodiments, the 240-g may be integrated as part of computing device 220 as shown in FIG. 1. In other embodiments, camera device 240-g may comprise a peripheral device communicatively coupled to computing device 220. Furthermore, while shown in FIG. 1 as having different components and/or features, it should be understood that computing devices 120, 220 could comprise the same components and/or features and still fall within the described embodiments. The embodiments are not limited in this respect.

Although not shown in FIG. 1, the computing devices 120, 220 may further comprise one or more device resources commonly implemented for computing devices, such as various computing and communications platform hardware and software components typically implemented by a personal electronic device or computing device. Some examples of device resources may include without limitation a co-processor, a graphics processing unit (GPU), a chipset/platform control hub (PCH), an input/output (I/O) device, computer-readable media, display electronics, display backlight, network interfaces, location devices (e.g., a GPS receiver), sensors (e.g., biometric, thermal, environmental, proximity, accelerometers, barometric, pressure, etc.), portable power supplies (e.g., a battery), application programs, system programs, and so forth. Other examples of device resources are described with reference to exemplary computing architectures shown by FIG. 7. The embodiments, however, are not limited to these examples.

In the illustrated embodiment shown in FIG. 1, the processor 130 may be communicatively coupled to the wireless transceivers 180-e and the memory unit 150. The memory unit 150 may store a gesture recognition application 140 arranged for execution by the processor 130 to recognize gesture inputs. The gesture recognition application 140 may generally provide features to combine the flexibility of statistical methods to build rich gesture vocabularies with deterministic methods to constrain the recognition to only those movements that satisfy certain physical characteristics. Additionally, the gesture recognition application 140 may be operative in some embodiments to identify and evaluate gestures on one or more of computing devices 120, 220 based on different types of raw data, such as data from the sensors 146-f and/or data from the camera device 240-g. In this manner, gesture recognition application 140 may be operative to assist in the process of establishing a secure wireless connection between computing device 120 and computing device 220 based on a same gesture input detected using different detection methods or technology on the respective devices 120, 220. Other embodiments are described and claimed.

FIGS. 2-5 illustrate embodiments of operating environments 200-500 respectively. More particularly, the operating environments 200-500 may illustrate a gesture being performed by a user of computing device 120 in proximity to computing device 220. More particularly, the gesture may be performed within a field of view of a camera device of the computing device 220. In various embodiments the computing devices 120, 220 shown in FIGS. 2-5 may be the same or similar to computing devices 120, 220 of FIG. 1. Additionally, while the computing device 220 (including camera device 240-g) may be shown as a separate device from display 222 in FIGS. 2-5, it should be understood that computing device 220 and/or camera device 240-g may be incorporated in display 222 and still fall within the described embodiments. Moreover, it should be understood that FIGS. 2-5 show computing device 120 as a smartphone and computing device 220 as a set-top box coupled to a display 222 (e.g. a digital television) for purposes of illustration and not limitation. As such, computing devices 120, 220 could take any suitable form or comprise any suitable computing device as described elsewhere herein and still fall within the described embodiments. The embodiments are not limited in this respect.

FIG. 2 illustrates an embodiment of an operating environment 200 for the computing devices 120, 220. More particularly, the operating environment 200 (and similarly the operating environments 300, 400 and 500) illustrates an embodiment where a secure wireless connection between computing device 120 and computing device 220 may be desired. For example, a user may wish to control computing device 220 using computing device 120, a user may wish to transfer data between computing devices 120 and 220, or perform any number or type of other computing actions as will be understood by one skilled in the art.

To establish a simple and secure connection, it may be advantageous in some embodiments for a user to simply perform a gesture motion in the air with computing device 120 and to verify the gesture motion and/or authenticate the user using information detected by both computing device 120 and computing device 220 as shown in FIG. 2. In this manner, the setup procedure to establish the secure connection may be greatly simplified, thereby improving the user experience.

In various embodiments, the operating environment 200 may illustrate a gesture motion 210 made by user 202 with computing device 120. As shown in FIG. 2, computing device 120 may be moved in the air by user 202 in a star-shaped pattern as illustrated by gesture 210. For example, user 202 may hold computing device 120 in their hand and draw the star-shaped gesture 210 in the air with the device 120. While the gesture motion 210 is shown as a star-shaped pattern in FIG. 2, it should be understood that any suitable gesture motion could be used and still fall within the described embodiments.

In various embodiments, sensors 146-$f$ of computing device 120 may detect the gesture motion 210. Additionally, gesture motion 210 may also be detected by camera device 240-$g$ of computing device 220. In various embodiments, the detected gesture motion 210 may be analyzed and acted upon by gesture recognition application 140 of computing device 120, computing device 220 or a remote computing device (not shown) as described in more detail with reference to FIGS. 3-5. Other embodiments are described and claimed.

In some embodiments, each computing device 120, 220 may implement a separate/different gesture recognition algorithm 140. For example, the gesture recognition algorithm 140 of computing device 120 may be suited or optimized for analyzing gesture data from the sensors 146-$f$ while gesture recognition algorithm 140 of computing device 220 may be suited or optimized for analyzing gesture data from the camera device 240-$g$. In this manner, each device 120, 220 may be optimized to analyze the data collected by that device 120, 220. The embodiments are not limited in this respect.

To enable gesture based authentication and device pairing, known gesture signatures may be required in some embodiments. For example, gesture recognition application 140 may include a training phase or training mode that may be operative to establish a database of trained gestures or gesture models 144 to analyze any number of gesture motions associated with any number of users. The training phase may be initiated by a user using either of computing devices 120 or 220 or the training phase may be automatically initiated when a computing device 120 is detected in proximity to computing device 220. In some embodiments, the training phase may be initiated for the computing devices 120, 220, video data and sensor data corresponding to motion of the computing device 120 may be received based on a gesture motion selected by a user to comprise a gesture signature, and the video data and sensor data may be stored as a gesture model 144.

In the training phase, the gesture models 144 may be developed based on inertial sensor 146-$f$ and video device 240-$g$ training data and/or offline training where gesture motions are performed (possibly repeatedly) using computing device 120 in the field of view 205 of computing device 220 and the motions are tracked and recorded. In some embodiments, this may occur during a training phase where a user can select or is prompted to perform one or more gesture motions and the gesture motions are associated with one or more users, activities or tasks. In other embodiments, the gesture models 144 may be pre-defined and/or pre-loaded onto computing device 120 and/or computing device 220. Other embodiments are described and claimed.

In various embodiments, separate gesture signatures or gesture models 144 may be developed and stored for the different devices 120, 220 based on the different gesture data collected by those devices 120, 220. For example, computing device 120 may collect gesture data associated with sensors 146-$f$ that is used to create inertial sensor based gesture signatures/models 144. Similarly, computing device 220 may collect gesture data associated with camera device 240-$g$ that is used to create vision based gesture signatures/models 144. In this manner, each device 120, 220 may include or comprise its own set of gesture signatures/models corresponding to the type of data collected by that device 120, 220. In some embodiments, separate gesture signatures/models 144 may be generated and/or stored for each of a plurality of gesture algorithms 142. While each computing device 120, 220 may include different gesture recognition algorithms 142 and different gesture signatures or models 144, it should be understood that these different models are used separately on each computing device 120, 220 to identify a same gesture made using the computing device 120 and detected using different detection means (e.g. sensors 146-$f$ and camera device 240-$g$ respectively) of both computing devices 120 and 220. Other embodiments are described and claimed.

In addition to storing gesture models 144, start and end poses may also be stored in some embodiments. For example, as part of the training phase, start poses and end poses associated with gesture motions may be identified based on accelerometer readings that are stationary before and after a pose. The computing devices 120, 220 may be operative to establish the start/end poses using, for example, three accelerometer axes Ax, Ay, Az measurements using bounding boxes or a Gaussian model using average Ax, Ay, Az values (+/−3 standard deviation) to identify the start and end pose for each gesture. The start and end poses may be used for pose filtering in some embodiments.

Based on the gesture models 144, computing devices 120, 220 may be operative to enable robust gesture recognition and/or device pairing/authentication in some embodiments. As opposed to simply relying on gesture recognition algorithms and statistical analysis to identify gesture motions at a single device as has been done in the past, the embodiments described herein additionally employ data from a second device configured to additionally record data about the gesture motion using a different type of sensor or capture device to increase the accuracy of or otherwise enhance the gesture recognition process.

Once the gesture models 144 are established, a user 202 may connect the devices 120, 220 using the gesture motion 210 moving forward. However, for the authentication/connection process to be effective, it must be enabled at appropriate times. For example, in some embodiments, one or more of the computing device 120, 220 may continually monitor for and buffer data associated with gesture motions. In other embodiments, the gesture recognition application 140 may be initiated based on a detected threshold proximity of the computing devices 120, 220. In still other embodiments, the gesture recognition application 140 may be manually launched by a user 202. In each of these situations, the first and second computing devices 120, 220 must be coupled to a same wireless local area network (WLAN) to enable gesture recognition as described herein. For example, computing devices 120, 220 may be connected to a same WiFi network. Other embodiments are described and claimed. The embodiments are not limited in this respect.

In various embodiments, the gesture motion 210 must be performed by user 202 while in the field of view 205 of camera device 240-g. The field of view 205 may comprise the extent of the observable world that is seen at any given moment from the perspective of camera device 240-g. While in the field of view, the gesture motion 210 may trigger inertial or other sensors 146-f of computing device 120 and camera device 240-g of computing device 220 to record or capture the gesture motion 210. In various embodiments, the gesture motion 210 may be defined by a specific movement that is preceded and followed by no movement or very little movement as described above. For example, readings from the sensors 146-f just before and just after a gesture is performed may represent no significant device movement and an analysis of the video data from camera device 240-g may reveal no significant movement of computing device 120 before and/or after the gesture motion 210.

In various embodiments, once the gesture recognition phase is initiated, gesture recognition application 140 may be operative on processor 130 to receive video data corresponding to motion of a first computing device 120 and to receive sensor data corresponding to motion of the first computing device 120. For example, the video data may be captured by one or more camera devices 140-g of the second computing device 220 and the sensor data may be captured by one or more sensors 146-f of the first computing device 120. In some embodiments, responsive to a user 202 performing a gesture motion 210 with computing device 120, one or more of accelerometer(s) 146-1 and/or gyroscope(s) 146-2 may be operative to sense the movement and raw data from the accelerometer(s) 146-1 and/or gyroscope(s) 146-2 may be provided to gesture recognition application 140 for interpretation and analysis. Similarly, video data captured by camera device 240-g may sense the movement and raw data from the video data may be provided to gesture recognition application 140 for interpretation and analysis.

In some embodiments, the interpretation and analysis may comprise comparing the video data and the sensor data to one or more gesture models 144. For example, based on the detected movement or gesture motion 210, gesture recognition application 140 may be operative on processor 130 to determine if the motion comprises a gesture motion using one or more gesture recognition algorithms 142. For example, gesture recognition using statistical analysis may be performed on the gesture motion 210 based on the video data and the sensor data to determine if the detected gesture motion 210 comprises a gesture movement corresponding to one or more of gesture models 144. In various embodiments, the gesture recognition application 140 may be operative on the processor 130 to compare the gesture motion 210 to a gesture motion database (e.g. gesture models 144) comprising a plurality of trained gesture motions corresponding to gesture models established during a training phase as described above. In some embodiments, the one or more gesture recognition algorithms may be based on one or more of a Hidden Markov Model (HMM), Bayesian network or neural network.

In various embodiments, one or more time stamps of the video data and the sensor data may be compared to determine if the motion captured by the one or more camera devices 240-g and the motion captured by the one or more sensors 146-f occurred at substantially a same time. This may add an additional layer of security to ensure that the motion captured by sensors 146-f and the motion captured by camera device 240-g correspond to a same gesture. In other embodiments, device identification information for the first and/or second computing device 120, 220 may be compared to known device identification information to determine if the computing devices 120, 220 are trusted/known devices as part of the gesture authentication process. Other embodiments are described and claimed.

Based on the comparing, a secure wireless connection or wireless link may be established between the first computing device 120 and a second computing device 220 if both the video data and sensor data correspond to a gesture model. For example, the secure wireless connection may comprise a Bluetooth® connection, a WiFi connection, a radio frequency (RF) connection or any other suitable connection. In various embodiments, the connection may enable the computing device 120 to control the computing device 220 or it may allow for the exchange of information between the computing devices 120, 220. The embodiments are not limited in this respect.

In some embodiments, the receiving and comparing may be performed at one of the first computing device 120, the second computing device 220 or a third computing device (not shown) wireless accessible by both the first and second computing devices 120, 220 as described in more detail below with references to FIGS. 3-5.

Figure 3:
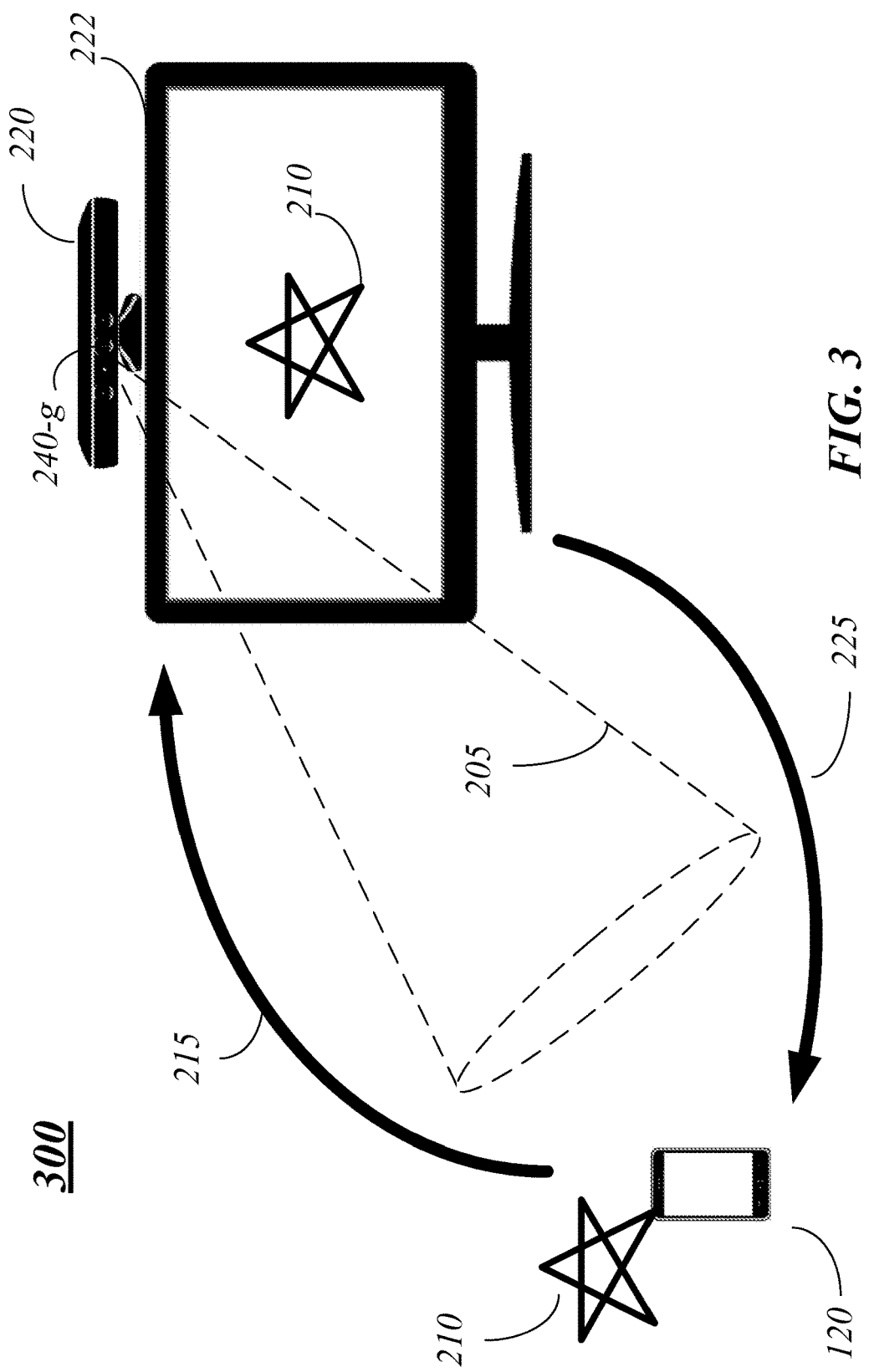
FIG. 3 illustrates an embodiment of a second operating environment.

FIG. 3 illustrates an embodiment of an operating environment 300 for the computing devices 120, 220. More particularly, the operating environment 300 may illustrate a gesture motion 210 made using computing device 120 while connected to a same wireless network and while in a field of view 205 of computing device 220. In the embodiment shown in FIG. 3, the gesture recognition processing and analysis may be performed at computing device 220.

While not limited in this respect, computing device 220 may comprise a digital television or a combination set-top box and digital television in various embodiments. In some embodiments, computing device 220 may comprise an apparatus comprising a processor 130 and gesture connection logic (e.g. gesture recognition algorithm 140, etc.) for execution on the processor 130. The gesture connection logic may be operative to receive video data corresponding to motion of a mobile computing device 120 captured by one or more camera devices 240-g coupled to the computing device 220 in some embodiments. For example, while in the gesture recognition mode, camera device 240-g may capture or record gesture motion 210 performed using mobile computing device 120 which may comprise a smartphone or tablet computing device in some embodiments.

In various embodiments, the logic may also be operative to receive sensor data corresponding to motion of the mobile computing device 120 captured by one or more sensors 146-f of the mobile computing device 120. For example, the sensor data may be analyzed by mobile computing device 120 and provided to computing device 220 or the raw sensor data may be provided to computing device 220 as illustrated by arrow 215.

The logic of computing device 220 may be operative to compare the video data and the sensor data to one or more gesture models 144 and to establish a secure wireless connection between the computing device 220 and the computing device 120 if the video data and sensor data correspond to a gesture model. For example, the computing device 220 may provide connection information to computing device 120 as indicated by arrow 225. This connection information may enable computing device 120 to establish a connection with computing device 220 as recited above with respect to FIGS. 1 and 2.

Figure 4:
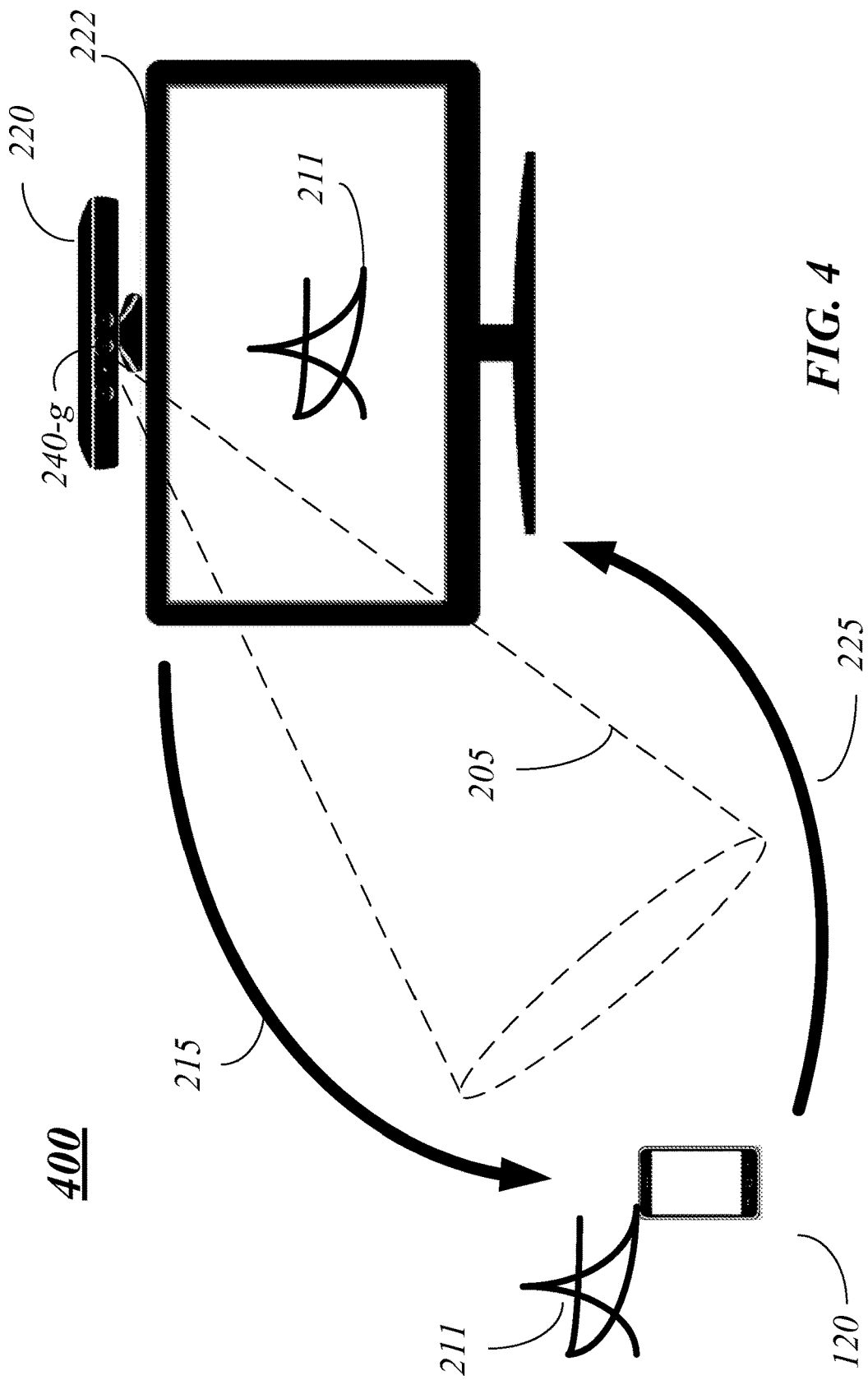
FIG. 4 illustrates an embodiment of a third operating environment.

FIG. 4 illustrates an embodiment of an operating environment 400 for the computing devices 120, 220. More particularly, the operating environment 400 may illustrate a gesture motion 211 made using computing device 120 while connected to a same wireless network and while in a field of view 205 of computing device 220. In the embodiment shown in FIG. 4, the gesture recognition processing and analysis may be performed at computing device 120.

While not limited in this respect, computing device 120 may comprise a smartphone or a tablet computing device in various embodiments. In some embodiments, computing device 120 may comprise an apparatus comprising a processor 130 and gesture connection logic (e.g. gesture recognition algorithm 140, etc.) for execution on the processor 130. The gesture connection logic may be operative to receive video data corresponding to motion of the computing device 120 captured by one or more camera devices 240-g of computing device 220 as shown by arrow 215. Computing device 120 may also be operative to receive sensor data corresponding to motion of the computing device 120 from one or more sensors 146-f of the computing device 120.

The logic of computing device 120 may be operative to compare the video data and the sensor data to one or more gesture models 144 and to establish a secure wireless connection between the computing device 120 and the computing device 220 if the video data and sensor data correspond to a gesture model. For example, the computing device 120 may provide connection information to computing device 220 as indicated by arrow 225. This connection information may enable computing device 220 to establish a connection with computing device 120 as recited above with respect to FIGS. 1 and 2.

Figure 5:
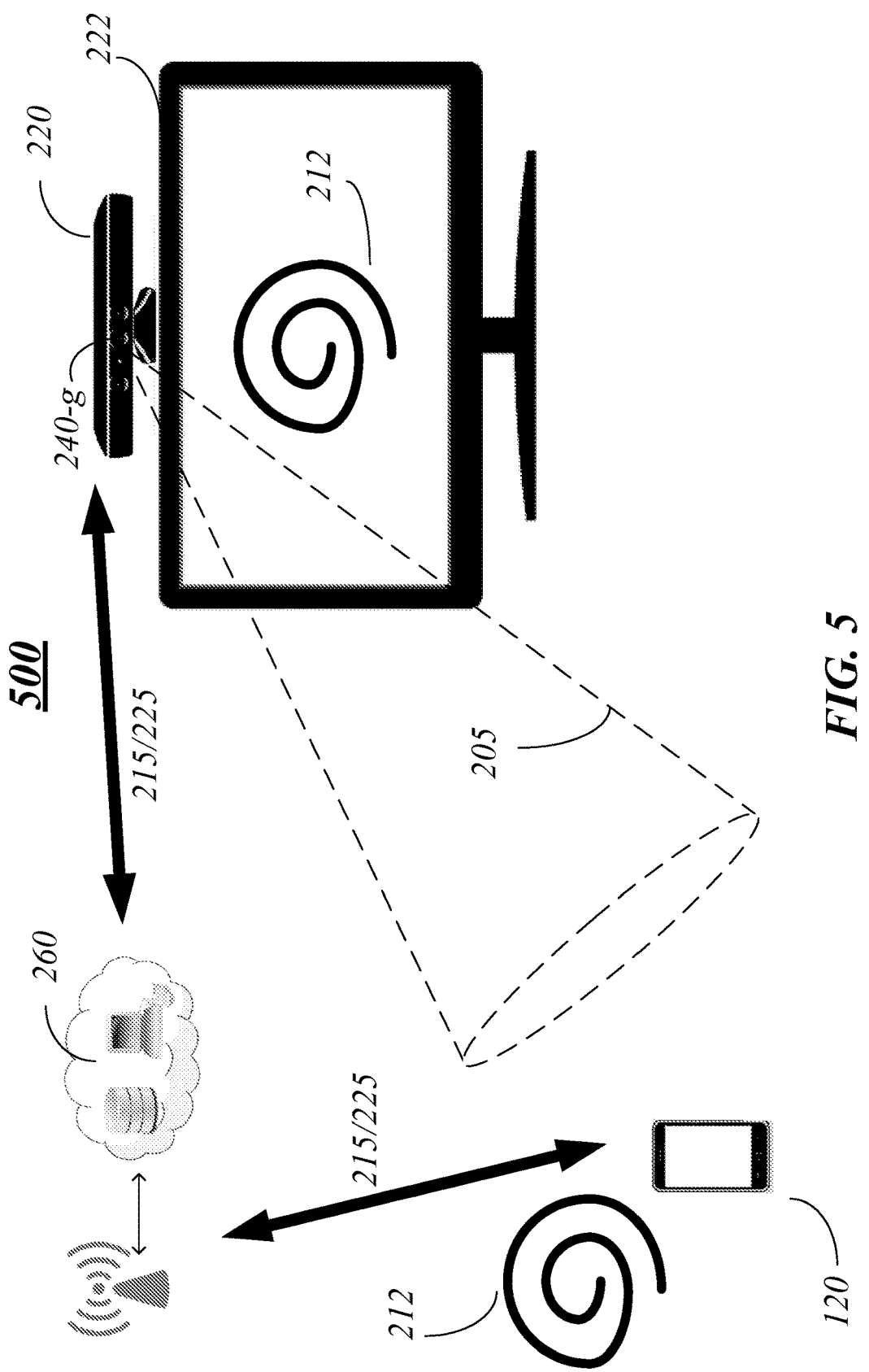
FIG. 5 illustrates an embodiment of a fourth operating environment.

FIG. 5 illustrates an embodiment of an operating environment 500 for the computing devices 120, 220. More particularly, the operating environment 500 may illustrate a gesture motion 212 made using computing device 120 while connected to a same wireless network and while in a field of view 205 of computing device 220. In the embodiment shown in FIG. 5, the gesture recognition processing and analysis may be performed at network computing device 260 wirelessly accessible by one or more of computing device 120 and computing device 220.

In various embodiments, network computing device 260 may comprise a computing device that is the same or similar to computing devices 120 and 220. In some embodiments, network computing device 260 may be considered a cloud computing device, for example. While not shown in FIG. 5, networking computing device may comprise elements similar to those recited above with respect to computing devices 120 and 220, including but not limited to the gesture recognition logic to enable gesture device authentication between two or more computing devices. The embodiments are not limited in this respect.

Computing devices 120, 220 may be operative to provide sensor and video information 215 to network computing device 260 in some embodiments. In various embodiments, network computing device 260 may be operative to compare the sensor and video data to one or more gesture models 144 stored on network computing device 260 and determine if a connection should be made between computing device 120 and 220 based on the comparison. If so, network computing device 260 may provide connection information 225 to each of computing devices 120, 220 to enable the connection. Other embodiments are described and claimed.

Offloading the gesture analysis to network computing device 260 may conserve power for computing devices 120, 220 and may also offload processing burden to improve the user experience for these devices. Additionally, utilizing network computing device 260 for gesture analysis may be advantageous as computing devices 120, 220 may already enjoy wireless connections with network computing device 260, thereby simplifying the exchange of sensor and video data. In various embodiments, the network computing device 260 may comprise a router, hub or server device for a home WiFi network, for example.

In some embodiments where the network computing device 260 is not used, computing devices 120, 220 may be forced to rely on broadcast or temporary wireless connections to exchange the sensor and video data before an authenticated connection can be established. For example, the computing device 120, 220 may first need to establish a connection (e.g. a non-secure and/or temporary connection) in order to exchange data and initiate the gesture recognition and authentication process. In various embodiments, this process may by a user or from the computing devices 120 and/or 220 implicitly, e.g. by recognizing someone in the field of view. In some embodiments, a wireless communication channel may be established to enable an anonymous, non-secure transition (send/receive) of data between the computing devices 120, 220, with explicit user initiation or implicit detection of the starting of a gesture. The embodiments are not limited in this respect.

FIG. 6 illustrates one embodiment of a logic flow 600. The logic flow 600 may be representative of some or all of the operations executed by one or more embodiments described herein. For example, the logic flow 600 may illustrate operations performed by the computing devices 120, 220.

In the illustrated embodiment shown in FIG. 6, the logic flow 600 may include receiving video data corresponding to motion of a first computing device at 602. For example, computing device 220 may receive the video data from camera devices 240-g coupled to computing device 220 or computing device 120 may receive the video data from computing device 220, depending upon which computing device 120, 220 is performing the gesture analysis/processing. At 604, the logic flow may include receiving sensor data corresponding to motion of the first computing device. For example, computing device 120 may receive the sensor data from sensors 146-f or computing device 220 may receive the sensor data from computing device 120, depending upon which computing device 120, 220 is performing the gesture analysis/processing.

The logic flow may include comparing, by a processor, the video data and the sensor data to one or more gesture models at 606. For example, whichever device 120, 220 has access to both the video data and the sensor data may confirm that the video data and the sensor data correspond to one another and may also confirm that the video data and the sensor data correspond to a gesture model. At 608, the logic flow may include establishing a secure wireless connection between the first computing device and a second computing device if the video data and sensor data correspond to a gesture model. For example, if the computing device performing the gesture analysis determines that the sensor data captured by computing device 120 and the video data captured by computing device 220 correspond to one another and also to a gesture model, a connection may be established between computing devices 120 and 220.

In various embodiments, to enable the gesture recognition processing, the logic flow may include (not shown) initiating a training phase for the first and second computing devices 120, 220, receiving video data and sensor data corresponding to motion of the first computing device 120, and storing the video data and sensor data as a gesture model. In some embodiments, to ensure that the sensor data and video data correspond, the logic flow may include comparing one or more time stamps the video data and the sensor data to determine if the motion associated with the video data and the sensor data occurred at substantially a same time.

While not shown in FIG. 6, in various embodiments the logic flow may include detecting motion of the first computing device using one or more sensors of the first computing device, determining that the first computing device is located within a field of view of one or more camera devices of the second computing device, and initiating the receiving of the video data and the sensor data based on the detecting and determining. Other embodiments are described and claimed.

Figure 7:
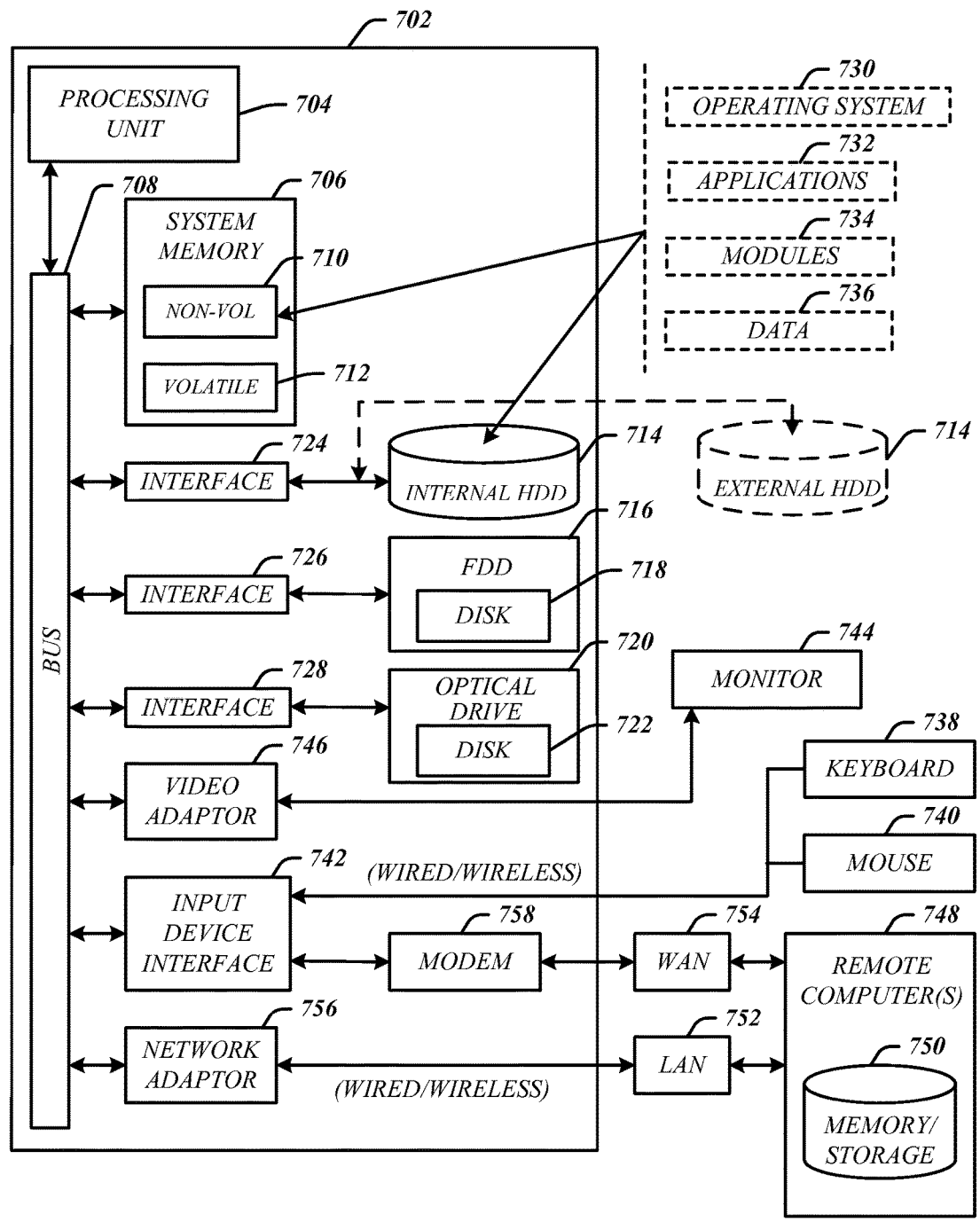
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of computing device 120, computing device 220 and/or network computing device 260. The embodiments are not limited in this respect.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, such as those described with reference to the processor 130 shown in FIG. 1.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the touch gesture recognition system 100 as previously described with reference to FIGS. 1-7 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments; examples one through thirty (1-30) provided below are intended to be exemplary and non-limiting.

In a first example, an article may comprise a non-transitory computer-readable storage medium containing instructions that if executed by a processor enable a system to receive video data corresponding to motion of a first computing device, receive sensor data corresponding to motion of the first computing device, compare the video data and the sensor data to one or more gesture models, and establish a secure wireless connection between the first computing device and a second computing device if the video data and sensor data correspond to a gesture model.

In a second example of the article, the video data captured by one or more camera devices of the second computing device and the sensor data captured by one or more sensors of the first computing device.

In a third example of the article, the one or more sensors of the first computing device comprising one or more of an accelerometer or a gyroscope and the camera device of the second computing device comprising one or more of a video camera or an infrared camera.

In a fourth example of the article, the first computing device located within a field of view of the one or more camera devices of the second computing device.

In a fifth example, the article may comprise instructions that if executed enable the system to compare one or more of time stamps of the video data and the sensor data to determine if the motion captured by the one or more camera devices and the motion captured by the one or more sensors occurred at substantially a same time or device identification information for the first or second computing device to known device identification information.

In a sixth example, the article may comprise instructions that if executed enable the system to initiate a training phase for the first and second computing device, receive video data and sensor data corresponding to motion of the first computing device, and store the video data and sensor data as a gesture model.

In a seventh example of the article, the first and second computing devices coupled to a same wireless local area network (WLAN).

In an eighth example of the article, the first computing device comprising one of a smartphone or a tablet computing device and the second computing device comprising one of a laptop computer, a desktop computer, a set-top box or a digital television.

In a ninth example of the article, the receiving and comparing performed at the second computing device.

In a tenth example of the article, the receiving and comparing performed at the first computing device.

In an eleventh example of the article, the receiving and comparing performed at a third computing device wireless accessible by both the first and second computing device.

In a twelfth example, an apparatus may comprise a processor and gesture connection logic for execution on the processor to receive video data corresponding to motion of a mobile computing device captured by one or more camera devices coupled to the apparatus, receive sensor data corresponding to motion of the mobile computing device captured by one or more sensors of the mobile computing device, compare the video data and the sensor data to one or more gesture models and establish a secure wireless connection between the apparatus and the first computing device if the video data and sensor data correspond to a gesture model.

In a thirteenth example, the apparatus may comprise one of a laptop computer, a desktop computer, a set-top box or a digital television and the mobile computing device comprising one of a smartphone or a tablet computing device.

In a fourteenth example of the apparatus, the apparatus may comprise or include the one or more camera devices, the one or more camera devices comprising one or more of a video camera or an infrared camera.

In a fifteenth example of the apparatus, the one or more sensors of the mobile computing device may comprise one or more of an accelerometer or a gyroscope.

In a sixteenth example of the apparatus, the mobile computing device may be located within a field of view of the one or more camera devices.

In a seventeenth example of the apparatus, the gesture connection logic may be operative to compare one or more of time stamps of the video data and the sensor data to determine if the motion captured by the one or more camera devices and the motion captured by the one or more sensors occurred at substantially a same time or device identification information for the mobile computing device to known device identification information.

In a eighteenth example of the apparatus, the gesture connection logic may be operative to initiate a training phase for the mobile computing device and the apparatus, receive video data and sensor data corresponding to motion of the mobile computing device, and store the video data and sensor data as a gesture model.

In a nineteenth example, an apparatus may comprise a processor and gesture connection logic for execution on the processor to receive video data corresponding to motion of the apparatus captured by one or more camera devices of a computing device, receive sensor data corresponding to motion of the apparatus from one or more sensors of the apparatus, compare the video data and the sensor data to one or more gesture models, and establish a secure wireless connection between the apparatus and the computing device if the video data and sensor data correspond to a gesture model.

In a twentieth example of the apparatus, the apparatus may comprise one of a smartphone or a tablet computing device and the computing device may comprise one of a laptop computer, a desktop computer, a set-top box or a digital television.

In a twenty-first example of the apparatus, the apparatus may comprise or include the one or more sensors, the one or more sensors comprising one or more of an accelerometer or a gyroscope.

In a twenty-second example of the apparatus, the one or more camera devices of the computing device may comprise one or more of a video camera or an infrared camera.

In a twenty-third example of the apparatus, the apparatus may be located within a field of view of the one or more camera devices of the computing device.

In a twenty-fourth example of the apparatus, the gesture connection logic may be operative to compare one or more of time stamps of the video data and the sensor data to determine if the motion captured by the one or more camera devices and the motion captured by the one or more sensors occurred at substantially a same time or device identification information for the computing device to known device identification information.

In a twenty-fifth example of the apparatus, the gesture connection logic may be operative to initiate a training phase for the apparatus and the computing device, receive video data and sensor data corresponding to motion of the apparatus, and store the video data and sensor data as a gesture model.

In a twenty-sixth example, a computer-implemented method may comprise receiving video data corresponding to motion of a first computing device, receiving sensor data corresponding to motion of the first computing device, comparing, by a processor, the video data and the sensor data to one or more gesture models, and establishing a secure wireless connection between the first computing device and a second computing device if the video data and sensor data correspond to a gesture model.

In a twenty-seventh example, the computer-implemented method may comprise detecting motion of the first computing device using one or more sensors of the first computing device, determining that the first computing device is located within a field of view of one or more camera devices of the second computing device, and initiating the receiving of the video data and the sensor data based on the detecting and determining.

In a twenty-eighth example, the computer-implemented method may comprise comparing one or more time stamps the video data and the sensor data to determine if the motion associated with the video data and the sensor data occurred at substantially a same time.

In a twenty-ninth example, the computer-implemented method may comprise initiating a training phase for the first and second computing device, receiving video data and sensor data corresponding to motion of the first computing device, and storing the video data and sensor data as a gesture model.

In a thirtieth example of the computer-implemented method, the first computing device comprising one of a smartphone or a tablet computing device and the second computing device comprising one of a laptop computer, a desktop computer, a set-top box or a digital television, the sensors comprising one or more of an accelerometer or a gyroscope, and the one or more camera devices comprising one or more of a video camera or an infrared camera.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system, comprising:
a memory; and
logic, at least a portion of which is comprised in circuitry coupled to the memory, the logic to:
initiate a training phase to associate a gesture signature with a computing device;
prompt the computing device to perform a start pose and one or more movements;
collect gesture data with an optical sensor based on the start pose and the one or more movements of the computing device;
utilize the gesture data to generate a vision based gesture signature;
associate the vision based gesture signature with the computing device; and
conclude the training phase.

2. The system of claim 1, the logic to monitor data from the optical sensor to detect the vision based gesture signature after conclusion of the training phase.

3. The system of claim 2, the logic to provide the computing device with wireless access to another computing device based on detection of the vision based gesture signature after conclusion of the training phase.

4. The system of claim 2, the logic to utilize the start pose to filter the data monitored from the optical sensor to detect the vision based gesture signature after conclusion of the training phase.

5. The system of claim 1, the logic to:
prompt the computing device to perform the start pose, the one or more movements, and an end pose; and
collect the gesture data based on the start pose, the one or more movements, and the end pose of the computing device.

6. The system of claim 1, the logic to initiate the training phase for the gesture signature based on a proximity detection of the computing device.

7. The system of claim 1, the computing device comprising second logic, the second logic to:
collect second gesture data with an accelerometer based on the start pose and the one or more movements; and
utilize the second gesture data to generate an inertial sensor based gesture signature.

8. The system of claim 7, the second logic to utilize the inertial sensor based gesture signature to gain wireless access to another computing device after conclusion of the training phase.

9. The system of claim 7, the second logic to collect the second gesture data based on the start pose, the one or more movements, and an end pose of the computing device.

10. A method, comprising:
initiating a training phase to associate a gesture signature with a computing device;
prompting the computing device to perform a start pose and one or more movements;
collecting gesture data with an optical sensor based on the start pose and the one or more movements of the computing device;
utilizing the gesture data to generate a vision based gesture signature;
associating the vision based gesture signature with the computing device; and
concluding the training phase.

11. The method of claim 10, comprising monitoring data from the optical sensor to detect the vision based gesture signature after conclusion of the training phase.

12. The method of claim 11, comprising providing the computing device with wireless access to another computing device based on detection of the vision based gesture signature after conclusion of the training phase.

13. The method of claim 11, comprising utilizing the start pose to filter the data monitored from the optical sensor to detect the vision based gesture signature after conclusion of the training phase.

14. The method of claim 10, comprising:
prompting the computing device to perform the start pose, the one or more movements, and an end pose; and
collecting the gesture data based on the start pose, the one or more movements, and the end pose of the computing device.

15. The method of claim 10, comprising initiating the training phase for the gesture signature based on a proximity detection of the computing device.

16. The method of claim 10, comprising:
collecting second gesture data with an accelerometer in the computing device based on the start pose and the one or more movements; and
utilizing the second gesture data to generate an inertial sensor based gesture signature.

17. The method of claim 16, comprising utilizing the inertial sensor based gesture signature to gain wireless access to another computing device after conclusion of the training phase.

18. The method of claim 16, comprising collecting the second gesture data based on the start pose, the one or more movements, and an end pose of the computing device.

19. At least one non-transitory computer-readable medium comprising a set of instructions that, in response to being executed by a processor circuit, cause the processor circuit to:
initiate a training phase to associate a gesture signature with a computing device;
prompt the computing device to perform a start pose and one or more movements;
collect gesture data with an optical sensor based on the start pose and the one or more movements of the computing device;
utilize the gesture data to generate a vision based gesture signature;
associate the vision based gesture signature with the computing device; and
conclude the training phase.

20. The at least one non-transitory computer-readable medium of claim 19, comprising instructions that, in response to being executed by the processor circuit, cause the processor circuit to monitor data from the optical sensor to detect the vision based gesture signature after conclusion of the training phase.

21. The at least one non-transitory computer-readable medium of claim 20, comprising instructions that, in response to being executed by the processor circuit, cause the processor circuit to provide the computing device with wireless access to another computing device based on detection of the vision based gesture signature after conclusion of the training phase.

22. The at least one non-transitory computer-readable medium of claim 20, comprising instructions that, in response to being executed by the processor circuit, cause the processor circuit to utilize the start pose to filter the data monitored from the optical sensor to detect the vision based gesture signature after conclusion of the training phase.

23. The at least one non-transitory computer-readable medium of claim 19, comprising instructions that, in response to being executed by the processor circuit, cause the processor circuit to:
prompt the computing device to perform the start pose, the one or more movements, and an end pose; and
collect the gesture data based on the start pose, the one or more movements, and the end pose of the computing device.

24. The at least one non-transitory computer-readable medium of claim 19, comprising instructions that, in response to being executed by the processor circuit, cause the processor circuit to initiate the training phase for the gesture signature based on a proximity detection of the computing device.

25. The at least one non-transitory computer-readable medium of claim 19, comprising instructions that, in response to being executed by the processor circuit, cause the processor circuit to:
collect second gesture data with an accelerometer based on the start pose and the one or more movements; and
utilize the second gesture data to generate an inertial sensor based gesture signature.

26. The at least one non-transitory computer-readable medium of claim 25, comprising instructions that, in response to being executed by the processor circuit, cause the processor circuit to utilize the inertial sensor based gesture signature to gain wireless access to another computing device after conclusion of the training phase.

27. The at least one non-transitory computer-readable medium of claim 25, comprising instructions that, in response to being executed by the processor circuit, cause the processor circuit to collect the second gesture data based on the start pose, the one or more movements, and an end pose of the computing device.

* * * * *